E. IBACH.
HUB CAP LOCKING DEVICE.
APPLICATION FILED JUNE 16, 1919.
1,424,480.
Patented Aug. 1, 1922.
2 SHEETS—SHEET 1.
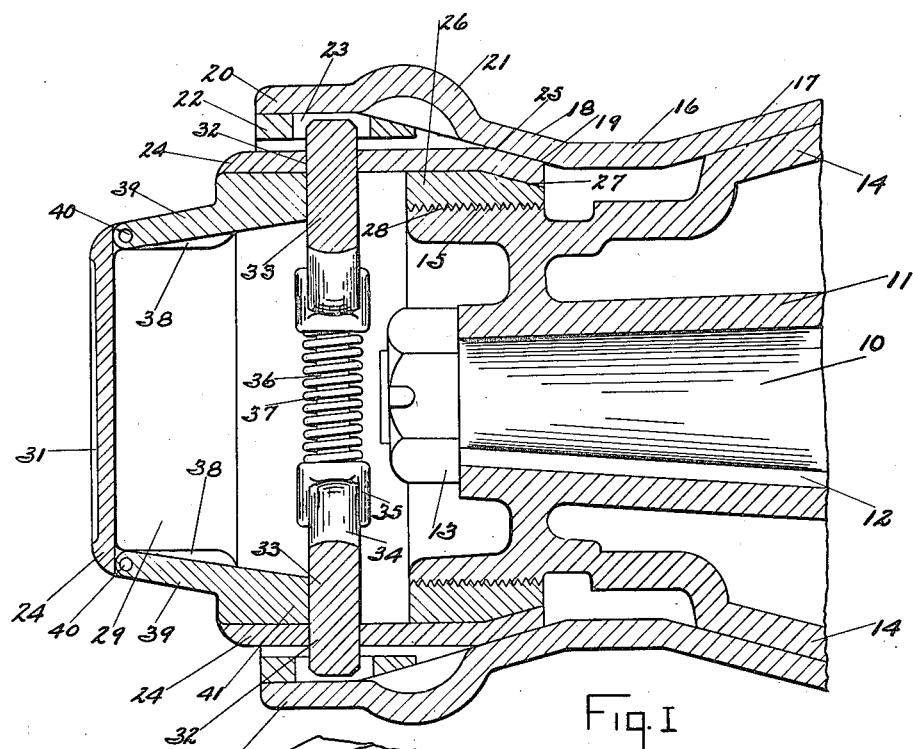
Fig. I
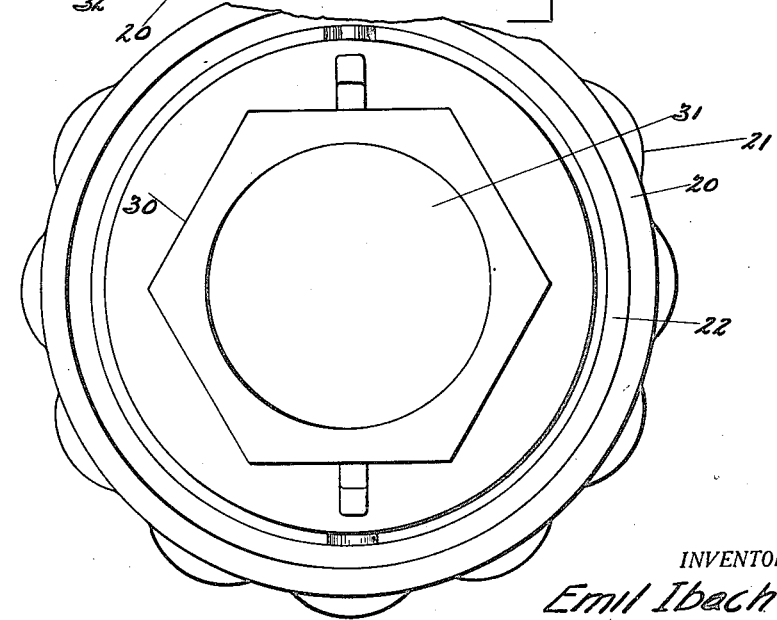
Fig. IV
INVENTOR.
Emil Ibach
BY
Chester H. Braselton
ATTORNEY.

E. IBACH.
HUB CAP LOCKING DEVICE.
APPLICATION FILED JUNE 16, 1919.
1,424,480.
Patented Aug. 1, 1922.
2 SHEETS—SHEET 2.
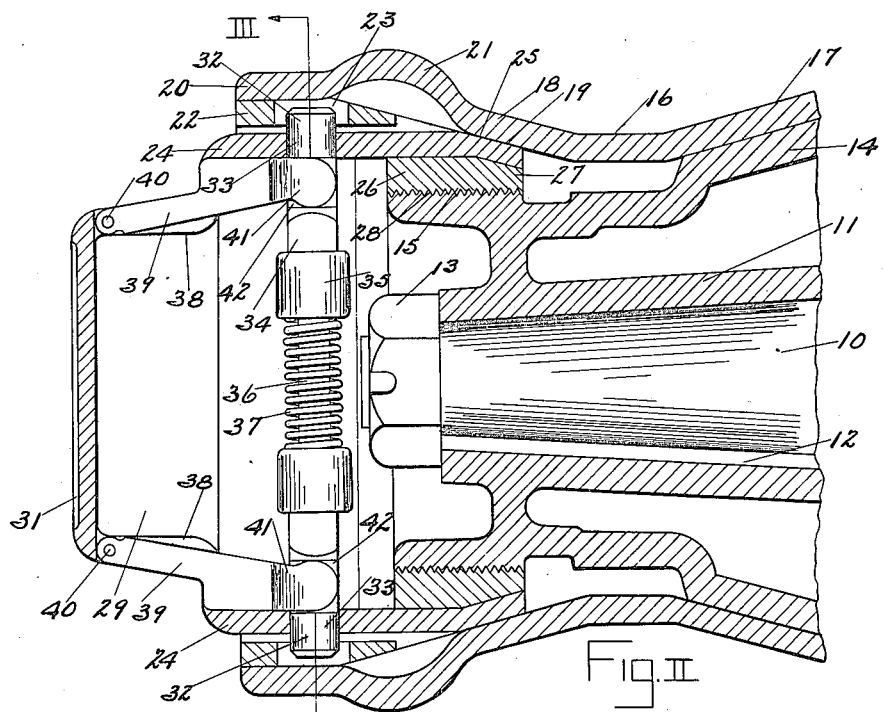
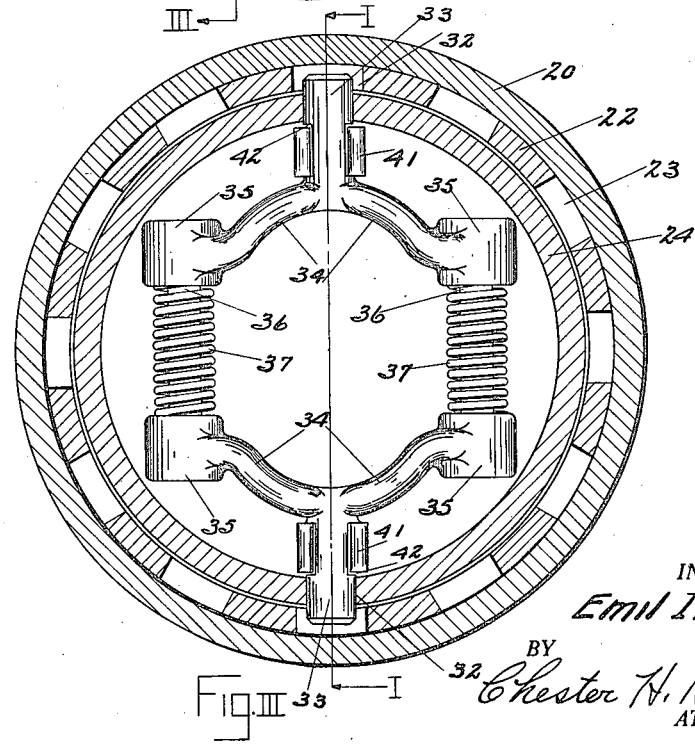
INVENTOR.
Emil Ibach
BY
Chester H. Braselton
ATTORNEY.

UNITED STATES PATENT OFFICE.

EMIL IBACH, OF PHILADELPHIA, PENNSYLVANIA, ASSIGNOR, BY MESNE ASSIGNMENTS, TO BUDD WHEEL COMPANY, OF PHILADELPHIA, PENNSYLVANIA, A CORPORATION OF PENNSYLVANIA.

HUB-CAP-LOCKING DEVICE.

1,424,480.  Specification of Letters Patent.  Patented Aug. 1, 1922.

Application filed June 16, 1919. Serial No. 304,518.

*To all whom it may concern:*

Be it known that I, EMIL IBACH, a citizen of Germany (who has declared his intention to become a citizen of the United States), residing at Philadelphia, Pennsylvania, have invented certain new and useful Improvements in Hub-Cap-Locking Devices, of which I declare the following to be a full, clear, and exact description.

This invention relates to improvements in hub cap locking devices and is particularly applicable to removable or demountable wheels such as are used in connection with motor vehicles in which the removable hub is retained in place on the permanent hub by means of a hub cap screwed on one of the parts.

It is desirable to provide suitable locking devices for locking the hub cap relative to the hub members so as to prevent the hub cap from unscrewing and permitting the removable hub to come off. It is very desirable that these locking devices should be of such a nature that they are released by the act of applying a wrench to the hub cap to unscrew it. It is also very desirable to provide the hub cap with a conical nose which engages an internal conical surface on the outer hub shell or removable hub, so that the latter will be centered as the hub cap is screwed into place.

One object of my invention is to provide an improved hub cap locking device of simple construction which, nevertheless, is very strong and efficient in operation.

Another object of my invention is to provide a locking device in which the locking member moves at right angles to the axis of the hub cap, which hub cap is provided with means for centering the outer hub as it is screwed into place.

Another object of my invention is to provide a hub cap locking device in which the locking member moves at right angles to the axis of the hub cap and is actuated by a member projecting through that part of the hub cap which is engaged by the wrench when the hub cap is to be removed.

Further objects, and objects relating to economies of material and details of construction, will definitely appear from the detailed description to follow. My invention is clearly defined and pointed out in the appended claims.

A structure constituting a preferred embodiment of my invention is illustrated in the accompanying drawing, forming a part of this specification, in which:

Figure I is a vertical, sectional view taken through the outer end of a demountable wheel hub and illustrating a device constructed in accordance with my invention, the section being taken on the line I—I of Figure III.

Figure II is a view similar to Figure I, with the locking device shown in full lines and side elevation.

Figure III is a transverse, sectional view, taken on the line III—III of Figure II, and, Fig. IV is an end view of a hub cap embodying my invention.

In the drawing, similar reference characters refer to similar parts throughout the several views and the sectional views are taken looking in the direction of the little arrows at the ends of the section lines.

Considering the numbered parts of the drawing, the inner hub 11 is mounted on the axle 10 in the usual manner, being connected thereto by a spline, or key, 12 and held in position on the axle by the nut 13. The inner hub 11 has a tapered seating surface 14, and, at its forward end, a cylindrical externally threaded portion 15. The outer hub shell 16 is removably mounted on the inner hub and has a portion 17 with an internal tapered seating surface which seats upon the seating surface 14 of the inner hub. Any suitable means are provided to limit or prevent rotative movement of the outer hub shell relative to the inner hub, for instance, the surfaces 14 and 17 may be made of octagonal or non-circular cross-section. The outer hub shell 16 is provided, near its forward end, with a portion 18, having an internal conical surface 19. The forward end of the outer hub shell terminates in the annular flange 20 and between the portion 18 and said flange there are a plurality of bosses, or projections, 21, struck up from the body of the shell, in which the ends of the spokes are anchored. The ring 22, provided with a plurality of openings 23 therein, is firmly secured in a suitable manner to the inner surface of the flange 20.

The outer hub shell 16 is held in place and prevented from axial movement on the inner hub by means of a hub cap or nut 24 which is partially housed within the forward end of the outer hub shell. The rear end of this nut 24 is swaged or crimped inwardly to clamp and retain in position an internally threaded ring 26, the rear end of which is tapered, at 27, and which has the internal thread 28 co-operating with the externally threaded portion 15 of the inner hub. The rear end of the nut 24 has a conical nose 25 which co-operates with the internal conical surface 19 to center the outer hub shell. The forward portion 29 of the nut is adapted to be engaged by a wrench to rotate the nut and, for this purpose, its exterior surface 30 has a hexagonal cross section. The forward end of the nut is provided with a recess 31 in which the name plate may be mounted.

A pair of reciprocable locking pins 33 are slidably mounted in openings 32, formed in the side wall of the nut 24. Each of these locking pins 33 has a laterally extending cross-head 34, provided with bosses 35 at the ends thereof. Guide pins 36 are fastened in the bosses on one of the cross-heads and are slidably mounted in transverse openings formed in the bosses of the other cross-head. Compression springs 37 are interposed between the cross-head bosses around said guide pins. A pair of slots 38 are formed in the forward portion 29 of the nut, having the external hexagonal surface 30, and a swinging link 39, is mounted in each of said slots and pivoted to the nut by pin 40. The rear end of each of said links 39 is forked at 41 and the arms of the fork engage in notches 42, formed in the locking pins.

With the parts in the position shown in the drawings, rotation of the nut is prevented because the ends of the locking pins 33 engage in the openings 23 formed in the ring 22, which is fastened to the outer hub shell 16. It is therefore impossible for the nut to rotate so as to unscrew itself and allow the wheel to come off of the inner hub. When it is desired to remove the outer hub shell in order to change wheels, or for any other reason, a hexagonal socket wrench is applied to the hexagonal part 30 of the nut and the application of this wrench to the nut swings the links 39 inwardly on their pivots since part of these links project from the slots 38 beyond the hexagonal surface 30. The application of the wrench to the nut therefore reciprocates the pins 33, moving them inward towards each other against the tension of the springs 37 and withdrawing the ends of the pins 33 from the openings 23. It will be seen that, while the nut is being screwed into place the wrench will hold the locking pins retracted, and, when the nut has been screwed home and the wrench removed, the springs 37 will force the locking pins 33 outwardly into locking engagement with the openings 23 which are in line with them. The outward swinging movement of the links is limited by the engagement of the links with the inner side wall of the nut.

The nut 24 has a conical nose 25 which engages the internal conical surface 19 of the outer hub shell 16 and centers the hub shell as the nut is screwed home to hold the hub shell in place on the inner hub. The locking device includes a locking pin which moves in a plane perpendicular to the axis of the nut and this makes a very strong and efficient locking device as any force seeking to rotate the nut must act, when the pin is in its locking position, in a direction to shear the pin, thus giving the lock great strength. It will be seen that, in this construction, I have provided a nut having a conical centering nose and a locking pin movable in a plane at right angles to the axis of the nut and actuated by a member extending from the wall of the forward portion of the nut which is adapted to be engaged by a wrench. This provides a nut or hub cap which automatically centers the hub shell and at the same time provides a very strong and efficient locking device which is automatically released by the application of a wrench to the nut.

I am aware that the particular embodiment of my invention, which I have here shown and described, is susceptible of considerable variation without departing from the spirit of my invention, and therefore, I desire to claim my invention broadly, as well as specifically, as indicated by the appended claims.

Having thus described my invention, what I claim as new and desire to secure by Letters Patent, is:—

1. In a wheel, the combination of an inner hub, an outer hub removably and non-rotatably mounted thereon, said outer hub having an internal conical surface near its outer end, a nut screwed on the inner hub and having a conical nose engaging the conical surface of said outer hub, a reciprocable locking pin carried by said nut and movable radially with reference to the axis thereof and locking means on one of said hubs in position to be engaged by said locking pin.

2. In a wheel, the combination of an inner hub, an outer hub removably and non-rotatably mounted thereon, said outer hub having an internal conical surface near its outer end, a nut screwed on said inner hub and having a conical nose engaging the conical surface of said outer hub, the side wall of said nut being provided with an opening in front of said conical nose, a reciprocable locking pin carried by said nut and extending through said opening, said pin being movable radially with reference to the axis of said nut, and locking means on one of said hubs in position to be engaged by said locking pin.

3. In a wheel, the combination of an inner hub, an outer hub removably and non-rotatably mounted thereon, a nut screwed on said inner hub and having a portion engaging said outer hub, a reciprocable locking pin carried by said nut and movable in a plane transverse to the axis thereof, locking means on one of said hubs in position to be engaged by said pin, said nut having a portion of non-circular cross section in front of said pin and adapted to be engaged by a wrench to rotate the nut, and means for reciprocating said locking pin extending through the wall of said portion.

4. In a wheel, the combination of an inner hub, an outer hub removably and non-rotatably mounted thereon, a nut screwed on said inner hub and having a portion engaging said outer hub, the side wall of said nut being provided with two openings, one in front of the other, a reciprocable locking pin working in the rear opening and movable in a plane transverse to the axis of the nut, locking means on one of said hubs in position to be engaged by said pin, and a member extending through the forward opening for reciprocating said locking pin.

5. In a wheel, the combination of an inner hub, an outer hub shell removably and non-rotatably mounted thereon, a nut screwed on one of said members and engaging the other, a pair of reciprocable locking pins positioned and movable in a plane perpendicular to the axis of the nut, and members, projecting through the side wall of said nut in front of said plane, operable to reciprocate said locking pins.

6. In a wheel, the combination of an inner hub, an outer hub shell removably and non-rotatably mounted thereon, a nut screwed on one of said members and engaging the other, a pair of reciprocable locking pins positioned and movable in a plane perpendicular to the axis of said nut, and a pair of links pivoted in said nut and operatively connected to said pins to reciprocate them.

7. In a wheel, the combination of an inner hub, an outer hub shell removably and non-rotatably mounted thereon, a nut screwed on one of said members and engaging the other, said nut having a portion of non-circular cross-section, at its forward end, adapted to be engaged by a wrench to rotate the nut, a pair of reciprocable locking pins positioned and movable in a plane perpendicular to the axis of the nut and diametrically opposite each other, a compression spring interposed between said pins, and a pair of links pivoted in said nut, and each having a portion projecting through the non-circular portion of said nut, said links being operatively connected to said pins to reciprocate the same against the pressure of said spring.

8. In a wheel, the combination of an inner hub, an outer hub shell removably and non-rotatably mounted thereon, a nut screwed on one of said members and engaging the other, a pair of reciprocable locking pins positioned and movable in a plane perpendicular to the axis of said nut, each of said pins having a cross-head on its inner end, a pair of compression springs interposed between said cross-heads, and means for reciprocating said pins against the pressure of said springs.

9. In a wheel, the combination of an inner hub, an outer hub shell removably and non-rotatably mounted thereon, a nut screwed on one of said members and engaging the other, a pair of reciprocable locking pins positioned and movable in a plane perpendicular to the axis of said nut, each of said pins having a cross-head at its inner end, guide pins carried by one of said cross-heads and extending through openings in the ends of the other cross-head, compression springs interposed between said cross-heads, and means for reciprocating said pins against the pressure of said springs.

In testimony whereof, I affix my signature.

EMIL IBACH.